(12) United States Patent
Denecheau et al.

(10) Patent No.: US 6,882,646 B2
(45) Date of Patent: Apr. 19, 2005

(54) IP NETWORK OVER A PARTIALLY MESHED FRAME RELAY NETWORK

(75) Inventors: Lionel Denecheau, La Colle sur Loup (FR); Denis Esteve, Vence (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 09/887,501

(22) Filed: Jun. 22, 2001

(65) Prior Publication Data

US 2002/0051459 A1 May 2, 2002

(30) Foreign Application Priority Data

Oct. 27, 2000 (EP) .................................................. 480100

(51) Int. Cl.[7] .............................................. H04L 12/56
(52) U.S. Cl. ..................................... 370/392; 370/406
(58) Field of Search ................................. 370/392, 406

(56) References Cited

U.S. PATENT DOCUMENTS 6,188,671 B1 * 2/2001 Chase et al. ................. 370/232
2002/0147844 A1 * 10/2002 Denecheau et al. ......... 709/245
2003/0161328 A1 * 8/2003 Chase et al. ............. 370/395.52
2004/0194102 A1 * 9/2004 Neerdaels ................... 718/100

* cited by examiner

Primary Examiner—Melvin Marcelo
(74) Attorney, Agent, or Firm—John R. Pivnichny; David R. Irvin

(57) ABSTRACT

An IP network over a partially meshed Frame Relay network wherein the Frame Relay network includes at least a hub which is linked to each one of a set of spokes by a Permanent Virtual Circuit (PVC) identified by a first Data Link Connection Identifier (DLCI) associated with the hub and a second DLCI associated with the spoke The hub and the set of spokes define an IP subnet having a subnet address. Each spoke has an inverse ARP table in which the first DLCI identifying a PVC is mapped with the IP address of the hub as entry. The inverse ARP table of each spoke comprises, further to the entries corresponding to the IP addresses of the hubs to which the spoke is linked, at least a default entry identifying the subnet address whereby any frame the IP address of which corresponds to a spoke is routed to the hub by scanning inverse ARP table.

6 Claims, 2 Drawing Sheets

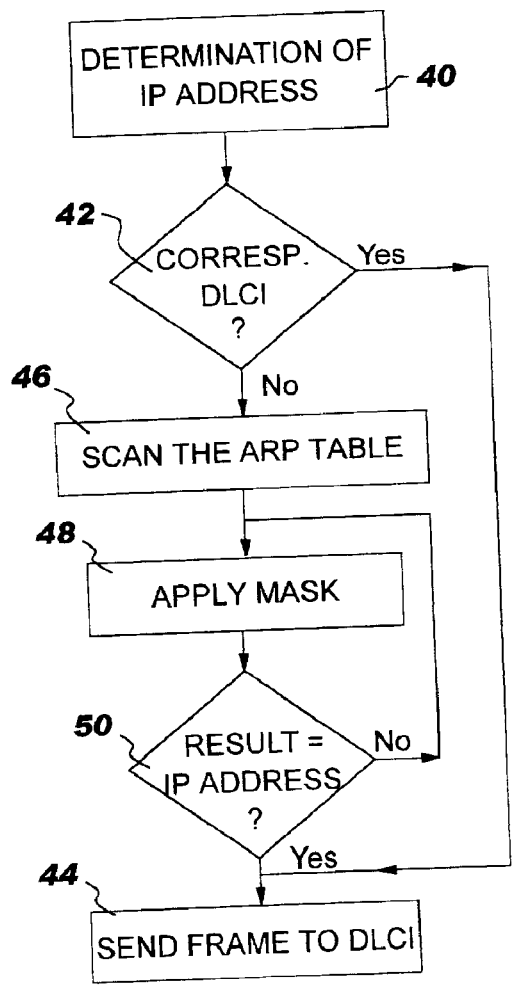

IP NETWORK OVER A PARTIALLY MESHED FRAME RELAY NETWORK

TECHNICAL FIELD

The present invention relates to Frame Relay networks wherein IP protocol is used on top of the Frame Relay protocol, and relates in particular to an IP configuration over a partially meshed Frame Relay network.

BACKGROUND

The introduction and widespread acceptance of intelligent workstations has changed the data processing paradigm from centralized host computing to distributed processing. Also, with the growth of distributed processing, the need for LAN interconnection and the growing use of graphics and images has lead to exponentially increasing network traffic. Furthermore, not only has the demand for connectivity changed, the technology to provide networking facilities has changed as well. Although newly introduced digital and fiber technologies provide faster and more reliable communication, they require networking techniques which are able to operate efficiently at higher speeds. In order to meet this requirement, fast packet switching has been developed.

Frame relay is one kind of fast packet switching. Because fast packet switching techniques such as Frame Relay operate below layer 3 of the OSI model, they readily accomodate multiple higher-layer protocols, and in particular the IP protocol.

A Frame Relay network provides a number of Permanent Virtual Circuits (PVC), which form the basis for the connections between stations attached to the network. The PVCs allow data exchange between these stations. The resulting set of interconnected devices is called the Frame Relay group, which may be either fully interconnected to form a fully meshed network, or only partially interconnected to form a partially meshed network. In either case, each PVC is uniquely identified at each Frame Relay interface by a Data Link Connection Identifier (DLCI). The DLCI is different on either end of the PVC, and consequently has strictly local significance at each interface.

A fully meshed Frame Relay network provides optimum connectivity. In the IP configuration, the whole network is seen as a single IP subnet. This configuration has no connectivity limitations since any router can reach all other routers. Unfortunately, a high number of PVCs are required, and the number of PVCs increases significantly whenever a new router is added to the network.

Generally, the mapping between the IP addresses of the routers and the DLCIs employs an inverse Address Resolution Protocol (ARP) table associated with the router. To update its inverse ARP table dynamically a router sends or receives requests over a PVC. In such requests, the known hardware address is the DLCI corresponding to the router end. When receiving either an ARP request or a reply to an ARP request over the PVC, the router can associate, in its inverse ARP table, the IP address (as entry) of the device at the other end of the PVC with the DLCI being used. Since a fully meshed network is seen as a single IP subnet, and since any router has PVC connectivity to all other routers in such a network, a router can dynamically map the remote IP address-to-DLCI using the inverse ARP method.

Partially meshed networks can be made of several IP subnets wherein one router, the hub, has a PVC connected to each of the other routers of the subnet, the spokes. In such a case, spoke-to-spoke connectivity is resolved via IP subnet-to-subnet connectivity, which is the normal IP routing process. When a spoke wants to reach another spoke of another subnet, it will use its routing table, which indicates a route via the hub.

This method requires a different IP subnet per PVC, which may result in IP-address exhaustion. It also creates very large routing tables because of the number of new subnets. These large routing tables may cause memory problems inside the routers, as well as high bandwidth utilizations between the links when exchanging the routes for these subnets. Partially meshed networks can also be a single subnet. In that case, however, a dynamic inverse table cannot be used, as it does not provide spoke-to-spoke connectivity.

One solution to the above problem is to do the mapping manually. This means that the inverse ARP table is manually configured with the IP addresses of all the spokes and the corresponding DLCIs. Unfortunately, such a solution, which must be implemented for all the spokes, becomes burdensome when many spokes are present in the network.

SUMMARY OF THE INVENTION

An object of the invention is to provide an IP network over a partially meshed Frame Relay network, wherein mapping between IP addresses and DLCIs in an inverse ARP table requires only one entry for mapping all the IP addresses of the other spokes of the same IP subnet to the DLCI used for reaching the hub associated with the subnet.

The invention relates therefore to an IP network over a partially meshed Frame Relay network wherein the Frame Relay network includes at least a hub which is linked to each one of a set of spokes by a Permanent Virtual Circuit (PVC) identified by a first data Link Connection Identifier (DLCI) associated with the hub and a second DLCI associated with the spoke. The hub and the set of spokes define an IP subnet that has a subnet address. Each spoke has an inverse ARP table, in which the first DLCI identifying a PVC is mapped with the IP address of the hub. The inverse ARP table of each spoke included, in addition to the IP addresses of the hubs to which the spoke is linked, at least a default entry that identifies the subnet address. Any frame that has an IP address which corresponds to a spoke is routed to the hub by scanning the inverse ARP table.

BRIEF DESCRIPTION OF THE DRAWINGS

The above and other objects, features and advantages of the invention will be better understood by reading the following detailed description of the invention in conjunction with the accompanying drawings, wherein:

FIG. 2 is a is a schematic representation of the inverse ARP table of a spoke wherein the static addresses corresponding to the system illustrated in FIG. 1 have been entered.

FIG. 3 is a flow chart representing the different steps used when a new frame received in the spoke is to be transmitted to an IP address.

DETAILED DESCRIPTION OF THE INVENTION

Figure 1:
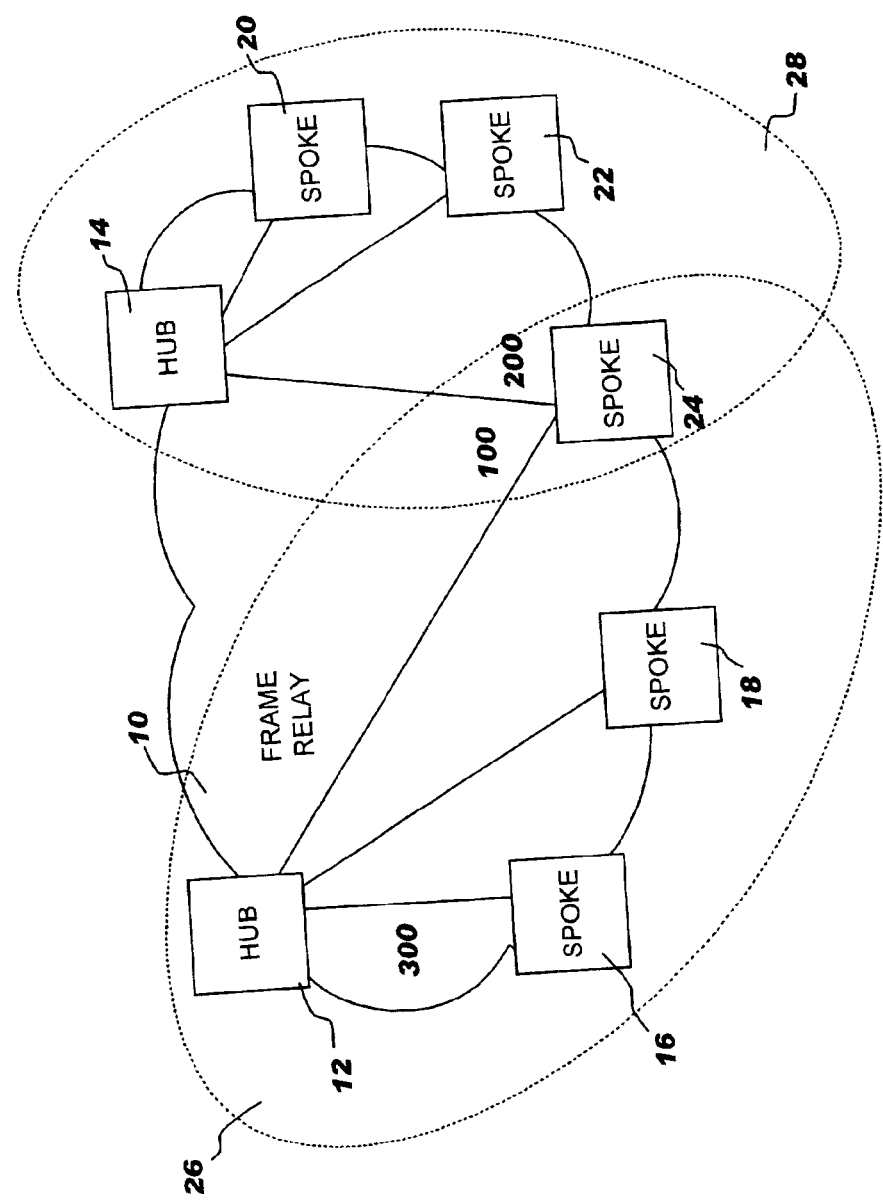
FIG. 1 is a block-diagram representing an IP network over Frame Relay including two subnets wherein the invention may be implemented.

FIG. 1 shows an exemplary IP network over Frame Relay wherein the invention may be implemented. The exemplanary network includes a partially meshed Frame Relay with two hub routers 12 and 14 (called hubs in the following) and a plurality of gateways (called spokes in the following). Spokes 16 and 18 are linked to hub 12 whereas spokes 20 and 22 are linked to hub 14. Spoke 24 is linked to both hub 12 and 14. While the system illustrated in FIG. 1 is an example, it must be understood that a large number of spokes (may be more than 50) could be linked to each hub.

Each link corresponds to a Permanent Virtual Circuit (PVC) in the Frame Relay 10, and is assigned a Data Link Connection Identifier (DLCI). Thus, spoke 24 is linked to hub 12 by DLCI 100 whereas spoke 24 is linked to hub 14 by DLCI 200.

As mentioned above, Frame Relay 10 is used in an IP network. Since there are two hubs, the IP network includes a first subnet 26 which includes hub 12 and spokes 16, 18, 24, and a second subnet 26 which includes hub 14 and spokes 20, 22, 24. Note that more than two subnets could exist in the system without being out of the scope of the invention.

In a general way, the address of a spoke comprises the subnet address followed by a subnet mask such as 255.255.255.x which enables determination of the specific spoke address. As an example, it is assumed here that the addresses in the first subnet are 10.1.1.X with X being the specific address of each spoke in the subnet, and that the addresses in the second subnet are 10.2.2.Y with Y being the specific address of each spoke in the subnet. Thus, the addresses of the spokes in the first subnet 26 could be:

spoke 24→10.1.1.1
hub 12→10.1.1.2
spoke 20→10.1.1.3
spoke 22→10.1.1.4

Likewise, the addresses of the spokes in the second subnet 28 could be:

spoke 24→10.2.2.1
hub 14→10.2.2.2
spoke 22→10.2.2.3
spoke 24→10.2.2.4

As already explained, each spoke has an inverse ARP table including the DLCI to be used for each IP address used as an entry of the table. As illustrated in FIG. 2, the ARP table of spoke 24 includes two parts, a first part containing the dynamic entries and a second part containing the static entries.

Whereas dynamic entries are automatically updated, the static entries are manually entered by an operator. In the present example, there are two dynamic entries in the ARP table of spoke 24 since it is linked to hub 12 and hub 14. The first entry gives DLCI 100 corresponding to 10.1.1.2 (IP address of hub 12) and the second entry gives DLCI 200 corresponding to 10.2.2.2 (IP address of hub 14).

The static entries correspond to the DLCIs which are to be used when spoke 24 wants to establish a connection with another spoke. Thus, for establishing a connection from spoke 24 to spoke 16, it is necessary to use DLCI 100 linking spoke 24 to hub 12 and then DLCI 300 linking hub 12 to spoke 16. Therefore, the static entry manually entered is DLCI 100 corresponding to the IP address 10.1.1.2 of hub 12. Assuming that the system includes a great number of spokes, it would be required to write an entry for each spoke into the table.

The essential feature of the invention is therefore to write only one entry for each subnet of the system. This entry is any IP address by default giving the DLCI linking the spoke to the hub. Such a default IP address may be the address of the subnet wherein the last part identifying the spoke is replaced by 0. Thus, in the present example, there are two entries as illustrated in FIG. 2. The first entry is the IP address 10.1.1.0 corresponding to DLCI 100 linking spoke 24 to hub 12, whereas the second entry is the IP address 10.2.2.0 corresponding to DLCI 200 linking spoke 24 to hub 14.

It must be noted that the default IP address to be entered could be 0.0.0.0 if the system includes a single subnet.

Accordingly, the IP address 10.1.1.0 is now the default layer 2 route for reaching any spoke of subnet 26, and IP address 10.2.2.0 is now the default layer 2 route for reaching any spoke of subnet 28. Thus, when hub 12 receives a frame from a spoke of subnet 26, it forwards it directly at layer 2 without passing the frame to the IP level.

The hub is also responsible for handling broadcast and limited broadcast frames which are to be forwarded to all of the spokes or to a proper subset of the spokes, respectively, as explained below.

When a frame is to be broadcast to all spokes of the subnet, its target IP address is the IP address of the subnet, for example 10.1.1.0 for subnet 26. The frame destined to all spokes of the subnet is routed across the IP network to the target subnet and broadcast locally on the subnet when it arrives there.

In prior systems, when a spoke receives a directed broadcast from any other interface, it passes the frame to the interface where the destination subnet resides. Then the network interface broadcasts the frame to all spokes of the subnet in a network-dependent manner. On the other (receiving) side, as the frame comes from the network interface that holds the subnet, the spoke keeps it for local delivery. For a limited broadcast originated from a local application and destined to any spoke that the port can reach, as opposed to network directed broadcast, the frame must not be routed by the receiving end. In this case, the receiving end passes the frame to the IP layer which delivers it to a local application.

In the system according to the invention and contrary to the prior technique, the hub which receives a subnet directed broadcast or a limited broadcast from a spoke of the subnet, keeps it for local delivery and also copies it to all the spokes belonging to the subnet. As a result, the broadcast is now handled under the sole responsibility of the hub for that subnet. Therefore, as opposed to the prior technique, the hub also performs the broadcast at layer 2 for frames coming from the spokes. Besides, unless the frame comes from the hub itself, in which case it is used for local delivery, the spokes forward the broadcast frame to the hub without copying it.

To forward a frame to the hub, a spoke performs the steps shown in FIG. 3. When a frame is received, the spoke determines the IP address in the header of the frame (step 40). It is then determined whether the inverse ARP table illustrated in FIG. 2 contains an entry for the IP address and the corresponding DLCI (step 42). If so, the frame is forwarded using this DLCI (step 44). If there is no entry for the IP address, the part of the table containing the static addresses is scanned (step 46).

Each entry is associated with a mask, which the process applies when examining the table (step 48). Such a mask is generally 255.255.255.0. Application of the mask on the IP address of a spoke belonging to a subnet results in the address of the subnet. Thus, the application of the mask 255.255.255.0 on the IP address 10.1.1.6 of a spoke of subnet 26 results in 10.1.1.0 which is the IP address of said subnet. At this stage, it is determined whether the resulting subnet address corresponds to the entry of the table being scanned (step 50). If not, the next entry in the table is scanned, and so on.

When there is only one subnet, the default IP address could be 0.0.0.0, as already mentioned. In such a case, the mask to be applied to the IP address of the frame is also 0.0.0.0.

Accordingly, the present invention enables frames to be forwarded from the spoke to the hub by using the subnet address when no exact match is found in the inverse ARP table as well for a unicast as for a directed broadcast or a subnet multicast.

We claim:

1. An IP network over a partially meshed frame relay network, comprising:
    a partially meshed frame relay network which includes:
        a hub associated with a DLCI;
        a plurality of spokes;
        a plurality of permanent virtual circuits that link the spokes to the hub; and
    an IP subnet that has an IP subnet address, and that includes the hub, a hub IP address associated with the hub, the spokes, and spoke IP addresses associated with the spokes;
    wherein each of the spokes has an inverse ARP table in which the DLCI is mapped with the hub IP address, which inverse ARP table further includes at least one default entry that identifies the subnet address, so that a frame that has any of the spoke IP addresses may be routed to the hub by scanning the inverse ARP table.

2. The network of claim 1, wherein the default entry is the subnet IP address.

3. The network of claim 1, further comprising means for forwarding a frame received from a first spoke of the subnet to a layer-2 destination on a second spoke of the subnet without passing the frame to an IP layer of the subnet.

4. The network of claim 1, further comprising means for broadcasting a broadcast frame received from a first spoke of the subnet to all spokes of the subnet at layer-2 without passing the broadcast frame to an IP layer of the subnet.

5. An IP network over a partially meshed frame relay network, comprising:
    a partially meshed frame relay network which includes:
        a single hub associated with a DLCI;
        a plurality of spokes;
        a plurality of permanent virtual circuits that link the spokes to the single hub; and
    a single IP subnet that has an IP subnet address, and that includes the single hub, a hub IP address associated with the single hub, the spokes, and spoke IP addresses associated with the spokes;
    wherein each of the spokes has an inverse ARP table in which the DLCI is mapped with the hub IF address, which inverse ARP table further includes at least one default entry that identifies the subnet address, which default entry is IP address 0.0.0.0, so that a frame that has any of the spoke IP addresses may be routed to the hub by scanning the inverse ARP table.

6. A method for forwarding a frame from a source spoke that has a source IP address to a destination spoke that has a destination IP address in IP network over a partially meshed frame relay network, comprising the acts of:
    checking an inverse ARP table of the source spoke for a DLCI that corresponds to the destination IP address;
    when the DLCI is found in the inverse ARP table of the source spoke, routing the frame to the destination spoke using the DLCI;
    when the DLCI is not found in the inverse ARP table of the source spoke, scanning the inverse ARP table to find a default DLCI associated with the IP destination address and routing the frame using the default DLCI.

* * * * *